(12) United States Patent
Takada et al.

(10) Patent No.: US 7,284,259 B1
(45) Date of Patent: Oct. 16, 2007

(54) TRANSMITTING METHOD, TRANSMITTING SYSTEM AND TRANSMISSION CONTROL DEVICE

(75) Inventors: Yasuhiro Takada, Kanagawa (JP); Masao Mizutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 09/707,720

(22) Filed: Nov. 7, 2000

(30) Foreign Application Priority Data

Nov. 9, 1999 (JP) .................................. 11-318534

(51) Int. Cl.
*H04N 7/18* (2006.01)
(52) U.S. Cl. ........................................................ 725/80
(58) Field of Classification Search ............. 725/74–80
See application file for complete search history.

(56) References Cited

U.S. PATENT DOCUMENTS 6,237,049 B1 * 5/2001 Ludtke .......................... 710/8
6,567,032 B1 * 5/2003 Mullaly et al. ............. 341/176
6,591,419 B2 * 7/2003 Barry et al. ................... 725/25
6,665,020 B1 * 12/2003 Stahl et al. .................. 348/552
6,684,401 B1 * 1/2004 Zou ............................ 725/80
6,918,123 B1 * 7/2005 Shteyn ....................... 719/318

* cited by examiner

*Primary Examiner*—Hunter B. Lonsberry
(74) *Attorney, Agent, or Firm*—Finnegan, Henderson, Farabow, Garrett & Dunner, L.L.P.

(57) ABSTRACT

To lessen the burden of a controller having an IEEE 1394 method or the like in a network requiring the controller. A transmitting system for transmitting data from a transmitting device (51) connected to a predetermined network to a receiving device (52) connected to the network, comprises a first device 53 having a control section for requesting connection management on the network for a data transmission to another device when an instruction for the data transmission is received from the transmitting device (51) or the receiving device (52), and a second device (60) having a control section for executing the connection management for the data transmission based on the request sent from the first device (53).

2 Claims, 11 Drawing Sheets

TRANSMITTING METHOD, TRANSMITTING SYSTEM AND TRANSMISSION CONTROL DEVICE

BACKGROUND OF THE INVENTION

1. Field of the Invention

The present invention relates to a transmitting method and system suitable for a data transmission between devices connected through a bus line having an IEEE 1394 method, for example, and a transmission control device applying the transmitting method.

2. Description of the Related Art

There has been developed an AV device capable of mutually transmitting information through a network using a serial data bus having the IEEE 1394 method. When a data transmission is to be carried out through the bus, an isochronous transportation mode to be used for real-time transmitting dynamic image data, audio data and the like which have comparatively large capacities and an asynchronous transportation mode to be used for surely transmitting a static image, text data, a control command and the like are prepared and a special band for each mode is used for the transmission, and the transmission in both modes can be mixed on one bus.

When the data transmission is to be carried out in the asynchronous transportation mode, a connection establishment processing for ensuring a transmission path between a data transmitting device and a data receiving device on the bus is executed under the control of a device referred to as a controller which is connected to the bus and the data transmission is performed between both devices through the ensured transmission path. In the following description, the data transmitting device connected to the bus will be referred to as a producer and the data receiving device connected to the bus will be referred to as a consumer.

A connection establishment processing between the producer and the consumer is executed by the controller based on a predetermined protocol. For example, the producer and the consumer are connected with point to point (P to P) through the transmission of a command defined by an AV/C command. After the connection is completed, data having a segment structure are successively transmitted from the producer to the consumer at the request of the consumer. When all the data are completely transmitted, the P to P connection is cut out through the transmission of a command under the control of the controller.

Thus, various data can be transmitted between optional devices connected through the serial data bus having the IEEE 1394 method. An AV/C command set is standardized with 1394 TA (Trade Association) and the details of the AV/C command are opened to the public through http://www.1394.org.

When the controller is to control the data transmission in the asynchronous transportation mode or the like between the devices connected through the serial data bus having the IEEE 1394 method, a device to function as the controller should mount a function corresponding to the data transmission to be carried out at that time. More specifically, any device connected to the bus does not function as the controller and only a device mounting a function corresponding to the setting method of the transmission path at that time can carry out a processing as a controller for performing the corresponding control.

If all the devices in a network connected through the bus mount the function of the controller, any device in the network can freely set the transmission path so that the degree of freedom of the data transmission in the network can be enhanced. However, when the function of the controller is mounted on all the devices in the network, the mounting function of each device is increased correspondingly. Consequently, there is a problem in that a cost for each device and the whole network is increased.

SUMMARY OF THE INVENTION

It is an object of the present invention to lessen the burden of a controller having an IEEE 1394 method or the like in a network requiring the controller.

The present invention provides a method of transmitting data from a transmitting device to a receiving device through a predetermined network, wherein when a first device for carrying out connection management for a data transmission between the transmitting device and the receiving device does not mount a corresponding connection management function, it gives a request for executing the connection management to a second device connected to the network and mounting the connection management function.

The connection management for the data transmission in the network is executed by the transmitting method according to the present invention. Consequently, also in the case in which the device for directly controlling the data transmission between the transmitting device and the receiving device cannot execute the connection management, the corresponding connection management can be executed by other devices provided in the network.

Moreover, the present invention provides a transmitting system for transmitting data from a transmitting device connected to a predetermined network to a receiving device connected to the network, comprising a first device having a control section for requesting connection management on the network for a data transmission to another device when an instruction for the data transmission is received from the transmitting device or the receiving device, and a second device having a control section for executing the connection management for the data transmission based on the request sent from the first device.

According to the transmitting system of the present invention, in the case in which the first device is to control the data transmission between the transmitting device and the receiving device, the connection management is executed by the second device.

Furthermore, the present invention provides a transmission control device connected to a predetermined network for controlling a data transmission on the network, comprising a receiving section for receiving a connection setting request from another device on the network, and a connection managing section for executing connection management between predetermined devices based on the request received by the receiving section.

According to the transmission control device of the present invention, when the connection setting request is received from another device on the network, the device can execute the connection management.

The above and further objects and features of the invention will more fully be apparent from the following detailed description with accompanying drawings.

DETAILED DESCRIPTION OF THE PREFERRED EMBODIMENTS

An embodiment of the present invention will be described below with reference to the accompanying drawings.

In the embodiment which will be described below, the present invention is applied to a home audio/video initiative (which will be hereinafter referred to as an HAVi) architecture. In order to make a basic structure according to the embodiment of the present invention clear, the HAVi architecture will be described.

The HAVi architecture serves to mutually control commercial electronic devices to be connected to a home network. In order to implement such mutual control, a design model for maintaining compatibility between the commercial electronic devices manufactured by various manufacturers is defined.

The HAVi architecture supports various devices such as an intelligent receiver/receiver (IRD), a digital video tape recorder (DVTR), a video tape recorder (VTR), a personal computer (PC) and peripheral devices, a digital video disk plate (DVD) and the like, and a communication is carried out between various devices through a common messaging system.

Figure 1:
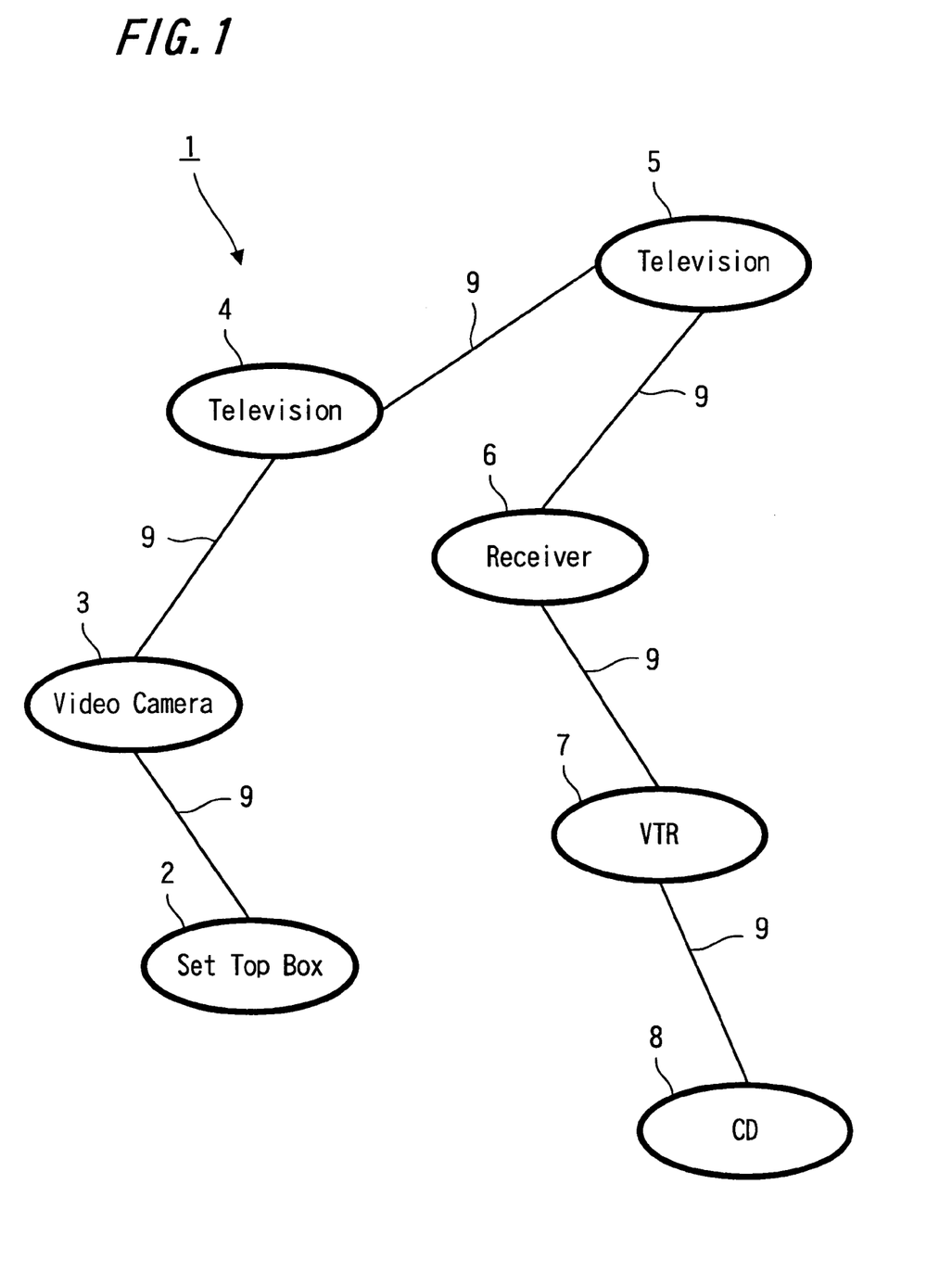
FIG. 1 is a diagram illustrating an example of a connection state between physical ports of an HAVi network.

FIG. 1 shows the physical connection state of each device in an HAVi network 1. As shown in FIG. 1, the HAVi network 1 is constituted by a set top box 2, a video camera 3, a first television receiver 4, a second television receiver 5, a receiver 6, a video tape recorder (which will be hereinafter referred to as a VTR) 7, and a compact disk (which will be hereinafter referred to as a CD) player 8 which are connected through respective ports, and each device is mutually connected through an IEEE 1394 serial communication bus 9 and an input/output port thereof.

In the present embodiment, a messaging system common to each device is implemented by using the IEEE 1394 serial communication bus 9 as a local bus platform. The IEEE 1394 serial communication bus 9 is used as a transmission path for digital audio data and digital video data as well as a command and status information.

Figure 2:
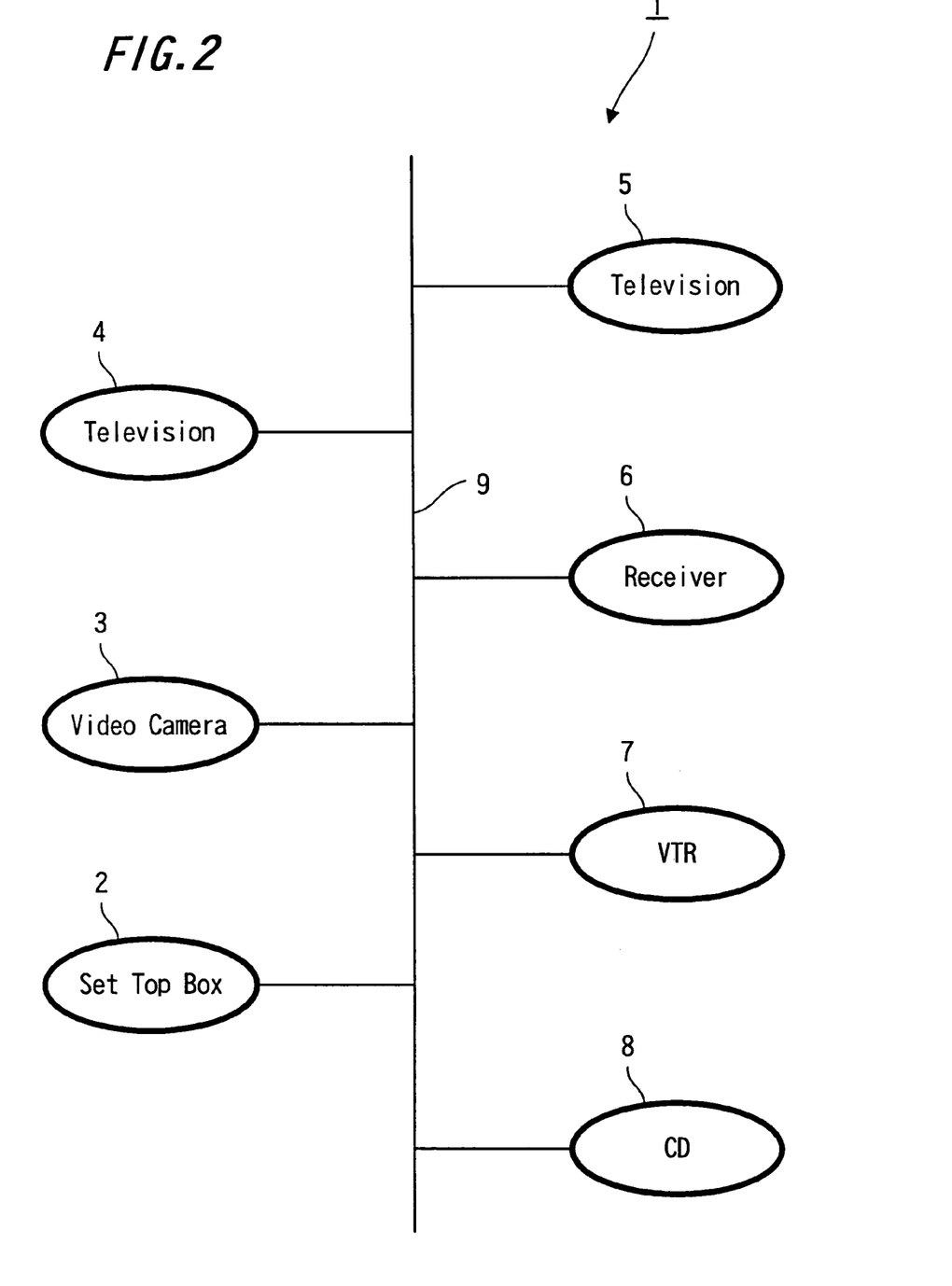
FIG. 2 is a diagram illustrating a logical connection state for a local bus of the HAVi network shown in FIG. 1.

FIG. 2 is a diagram illustrating the logical connection state of the HAVi network 1 shown in FIG. 1. As shown in FIG. 2, the set top box 2, the video camera 3, the first television receiver 4, the second television receiver 5, the receiver 6, the VTR 7 and the CD player 8 can be regarded to be logically connected to the common IEEE 1394 serial communication bus 9. Thus, the devices in the HAVi network can carry out a communication processing with one to one, respectively. More specifically, optional devices in the HAVi network 1 can transmit and receive data to and from all other devices.

Figure 3:
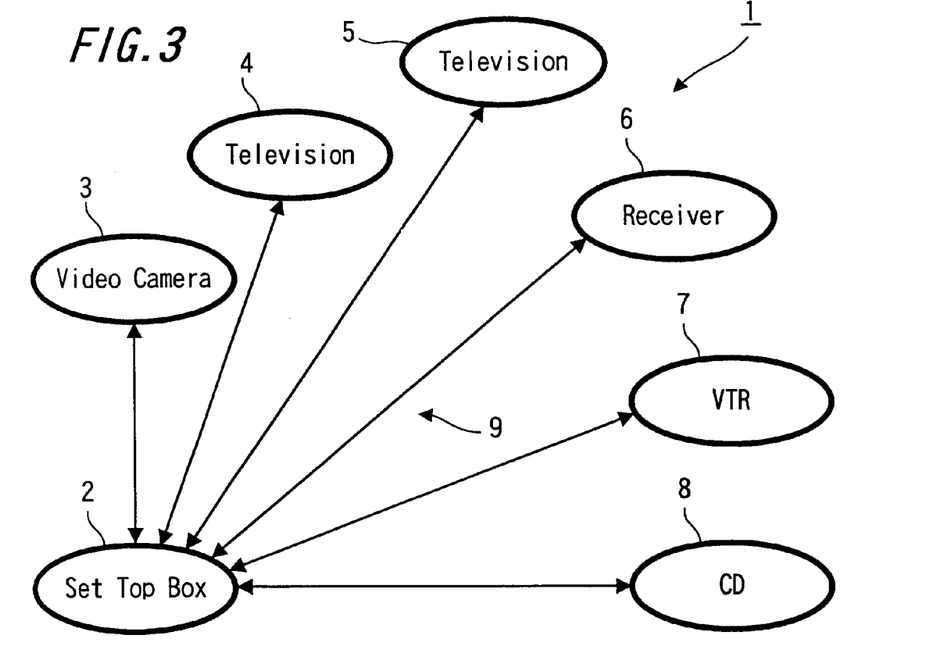
FIG. 3 is a diagram illustrating a logical connection state of one device with all other devices in the HAVi network shown in FIG. 1.

As shown in FIG. 3, for example, the set top box 2 can transmit and receive a communication packet to and from all other devices in the HAVi network 1. In this example, for instance, the set top box 2 having an IRD device can receive data from all other devices in the HAVi network 1 or can transmit data to the devices.

A mutual control model in the HAVi network architecture supports all the devices connected to the network, includes a control model for default, can extend the control model for default when a new device or an apparatus having the new device is put on the market, and furthermore, includes a common operation interface such as a graphic user interface.

In the HAVi network architecture, nodes in the HAVi network 1 are classified into three types. For example, a device which has already been put on the market, for example, the VTR 7 is referred to as a basic AV (basic audio visual which will be hereinafter referred to as a BAV) node. Moreover, a comparatively simple device such as the video cameral 3 or the digital VTR is referred to as an intermediate AV (intermediate audio visual which will be hereinafter referred to as an IAV) node. Furthermore, a device requiring more functions such as the set top box 2 having the IRD device is referred to as a full AV (full audio visual which will be hereinafter referred to as an FAV) node. The FAV node usually includes a hardware having a host control module and a local application program.

The IAV node and the FAV node transmit and receive a message through the HAVi network 1 by using a general-purpose message transmitting and receiving system, thereby carrying out a communication.

When a new device is connected to the HAVi network 1, the new device is recognized in the HAVi network 1 and is added to a register which is referred to as a global name database. The register records information about the characteristic of the device newly connected and a reference to a handler of the device such as a communication point. Other devices or services gives an inquiry to the same register and confirms the location of the new device. Furthermore, the communication with the device can be carried out by using the handler.

When a certain device is added to the network 1, the system architecture of the HAVi network 1 gives an inquiry to the device and confirms the characteristic and function of the device. When the characteristic of the device is confirmed, the system architecture controls the device by using two methods.

A first method, that is, a level 1 mutual control level uses a predetermined message set based on the AV/C command set defined by the IEEE 1394 method. All the IAV nodes and FAV nodes can access another device by using the message set, thereby controlling another device. On the other hand, since the BAV node has been developed before the architecture is defined, the device is controlled by using an old-fashioned protocol. The level 1 mutual control is the control level for default. In this case, the FAV node functions as a control node and the local representation of the IAV node is generated. The local representation will be referred to as a device control module (DCM) and has an API for transmitting a control message to a predetermined device.

Level 2 mutual control in the HAVi architecture is more advanced and serves to support a new device and the characteristic of the new device. In order to carry out the level 2 mutual control, a specific device is replaced with an override DCM in an ROM. The override DCM includes a command (message) set for the specific device which is to be used in the level 1 mutual control, and furthermore, has a special command set which is individually set by a manufacturer in order to control the new function of the device. By the model, the device notifies another device of the inclusion of the specific function.

In order to notify a certain device of the function of another device and to decide which command set is to be used for the same device, a standard device description structure is used. The standard device description structure will be hereinafter referred to as a self describing data (SDD) structure. The SDD structure is an extendable data structure. The SDD structure may be constituted by a small number of bytes for simply describing the type of a device, for example, a television, a VTR and the like. Alternatively, the SDD structure may be more complicated and the SDD structure may be caused to define the override DCM and the graphical representation of the device. Thus, by causing the SDD structure to define the graphical representation, the FAV node can visually display the device connected to the home network for the user.

By causing the above-mentioned graphical representation to have universality, image data provided by the SDD structure are displayed as a common user interface to a product of each company on a television, a monitor device and the like which are connected to the network. Consequently, the compatibility of various products of the manufacturers can be enhanced and each of the manufacturers can provide display units having respective features while maintaining the compatibility of the display units.

With the SDD structure, furthermore, a control device such as the FAV node can provide, to a user, a comprehensive user interface capable of controlling all the devices in the home network without a restriction to the type of the device and the manufactures.

Figure 4:
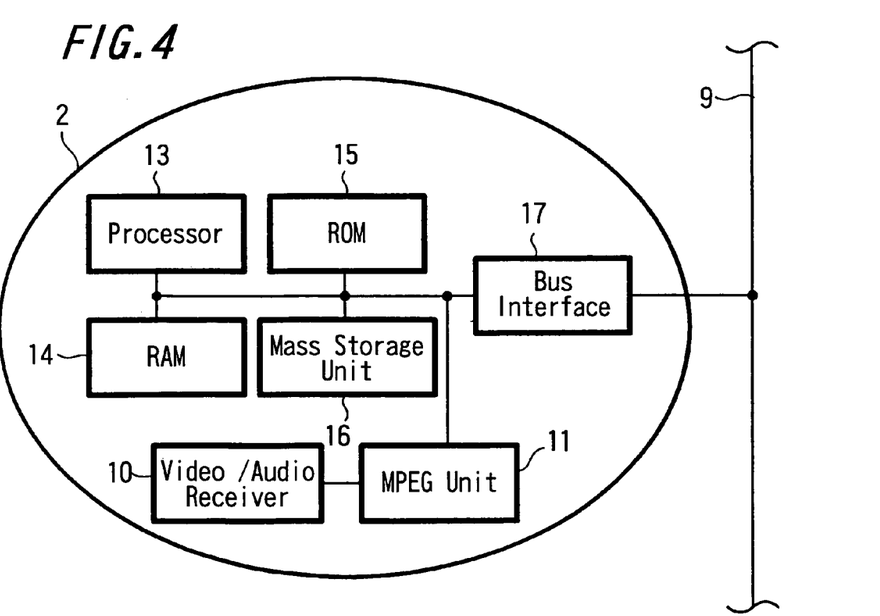
FIG. 4 is a block diagram showing the internal structure of an IRD (set top box) as an example of a device to be connected to a bus.

The set top box 2 to function as the FAV node includes a video/audio receiver 10 having a decoder function and an MPEG unit 11 as shown in FIG. 4. Furthermore, the set top box 2 includes a bus 12 to be used for transmitting information. To the bus 12 are connected one or more processors 13 for processing information and instructions, an RAM 14 to be a volatile memory for storing the information and instructions of the processor 13 and the like, an ROM 15 to be a volatile memory in which fixed information and instructions to be used by the processor 13 are written, a mass storage unit 16 having a recording medium such as a magnetic disk or an optical disk which serves to store information and instructions, and a bus interface 17 for functioning as an interface between the bus 12 and a local bus to be the IEEE 1394 serial communication bus, for example.

In the following embodiment, the software of the HAVi architecture can be regarded to be constituted by three application program interfaces (which will be hereinafter referred to as an API), that is, an AVOS/API, a mutual control API and an application API. The AVOS/API is a low order API and performs the function of a common operation system such as thread, communication or storage. The mutual control API is a common device control model, provides a basic representation model, and furthermore, has the function of extending the control model in response to a command inherent in each manufacturer. The application API is the above-mentioned API, includes an interactive television application and the like, for example, and furthermore, can also use a DAVIC/API set having a multimedia and hypermedia expert groups (MHEG) interactive application engine, for example.

Figure 5:
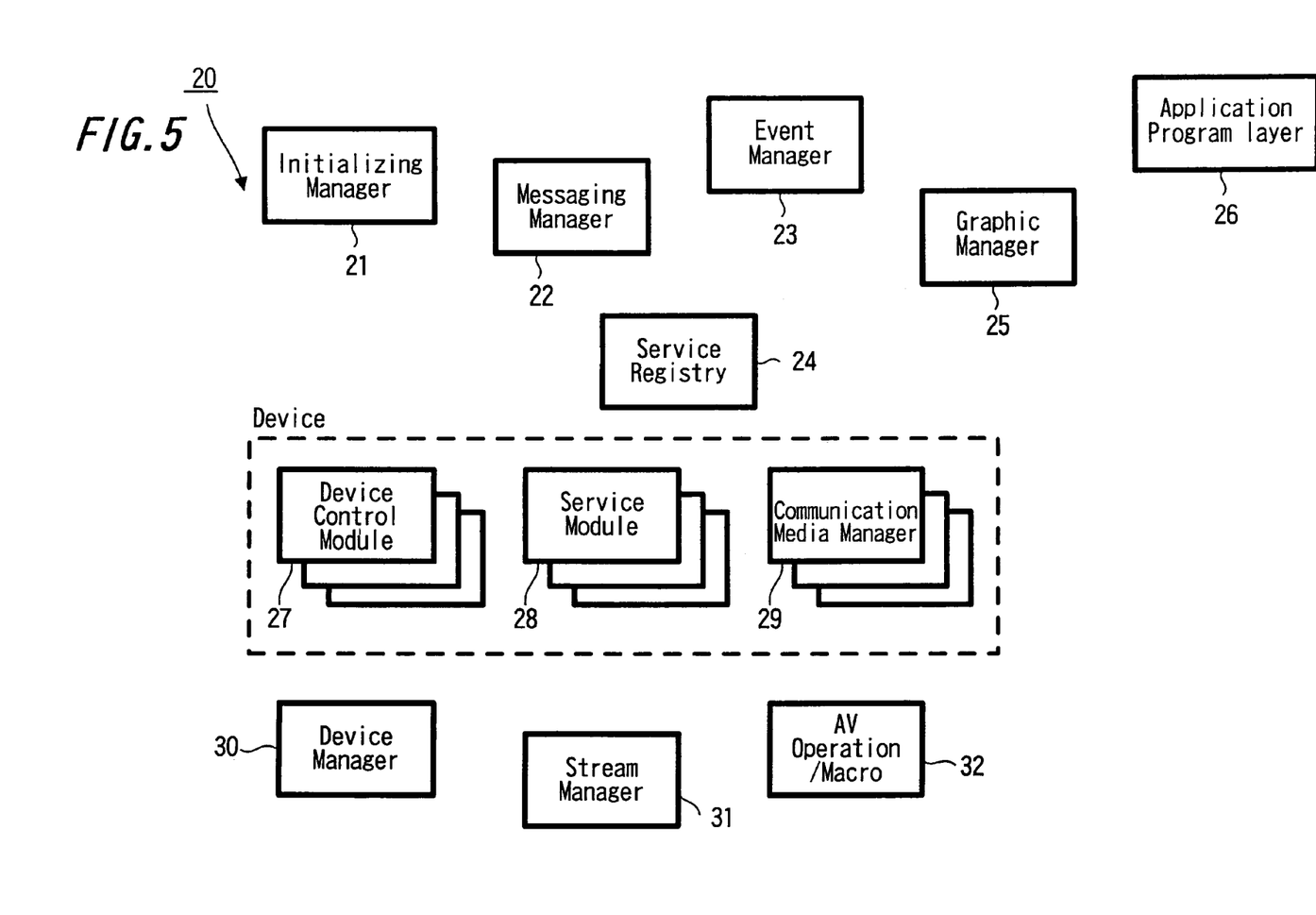
FIG. 5 is a diagram illustrating a service in which a node on the HAVi network can be utilized.

FIG. 5 conceptually shows the structure of an HAVi software architecture 20 using the HAVi architecture. The HAVi software architecture 20 is constituted by some components for providing a common function to the HAVi network.

A communication media manager 29 is extracted from a transport network to be a basis.

A device manager 30 has the function of specifying and generating a general-purpose device control module 27 to be utilized for the level 1 mutual control. Furthermore, the device manager 30 serves as a host of an override device module which is uploaded from other sites.

An application program layer 26 provides a general-purpose graphic API for causing an application and a device module to display information for a user.

A stream manager 31 selects the most efficient AV stream path in the home network. The stream manager 31 includes a data format manager for converting a format of an AV stream transmitted or received by each device connected to the home network into a format suitable for the device.

A message manager 22 supports a comprehensive messaging mechanism for causing each device connected to the home network to specify the locations of other devices and to carry out mutual control with another device.

The communication media manager 29 is an entity based on a media in the HAVi software architecture 20. The communication media manager 29 provides an abstract service to other HAVi components or application programs in the HAVi network. Furthermore, the communication media manager 29 provides a transportation mechanism corresponding to a communication media which is required for actual data communication between various devices in the HAVi network. Furthermore, the communication media manager 29 updates a GUID list which will be described below in response to a local bus reset. In order to achieve the above-mentioned object, each physical communication media includes the communication media manager 29.

An event manager 23, a service registry 24, the stream manager 31 and an initializing manager 21 will be described below.

Figure 6:
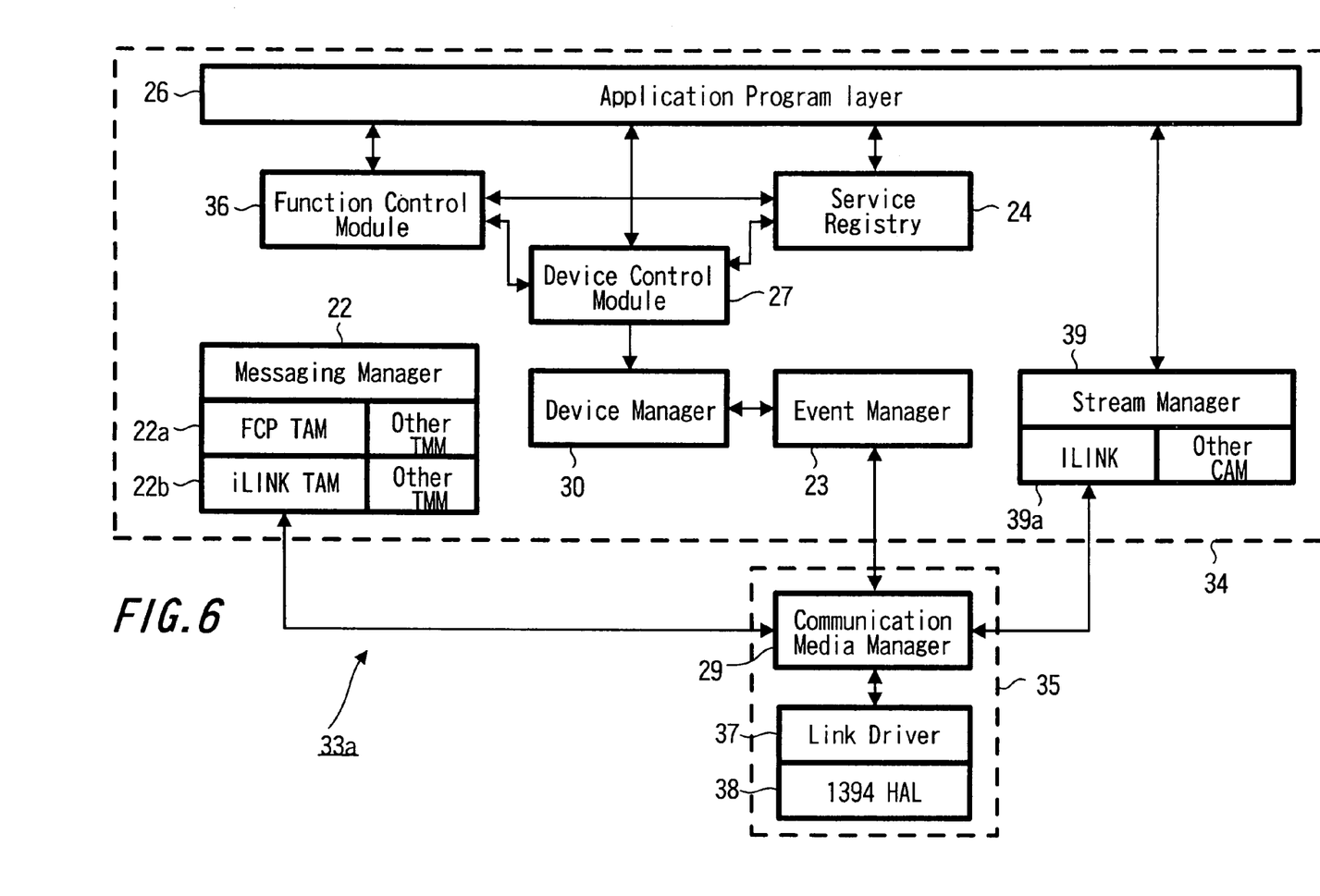
FIG. 6 is a diagram illustrating a communication path in an HAVi software architecture.

A diagram 33a shown in FIG. 6 is a data flow diagram of the HAVi software architecture 20 including a local bus HAL layer 34 of a local bus 9. In the diagram 33a, the highest layer is an application program layer 26. The application program layer 26 is connected to a functional control module layer 36 having an AV/C command. Moreover, the application program layer 26 is provided in the FAV and is also connected to the device control module 27, the service registry 24 and the stream manager 39.

The device control module 27 is controlled by the device manager 30 connected to the event manager 23. The event manager 23 is connected to the communication media manager 29. The stream manager 39 is inserted between the communication media manager 29 and the application program layer 26. By the stream manager 39, the application program layer 26 and the communication media manager 29 can transmit and receive data each other. The communication media manager 29 is also connected to the messaging manager 22.

The communication media manager 29 provides an interface to an IEEE 1394 interface 38 to be a local bus interface through a link driver unit 35. The link driver unit 35 has the function of updating the GUID list when the local bus reset is generated.

As described above, the local bus HAL layer 34 indicates a high order application and the link driver unit 35 indicates a low order application. The diagram 33a will be described below in more detail with reference to FIG. 8.

Figure 7:
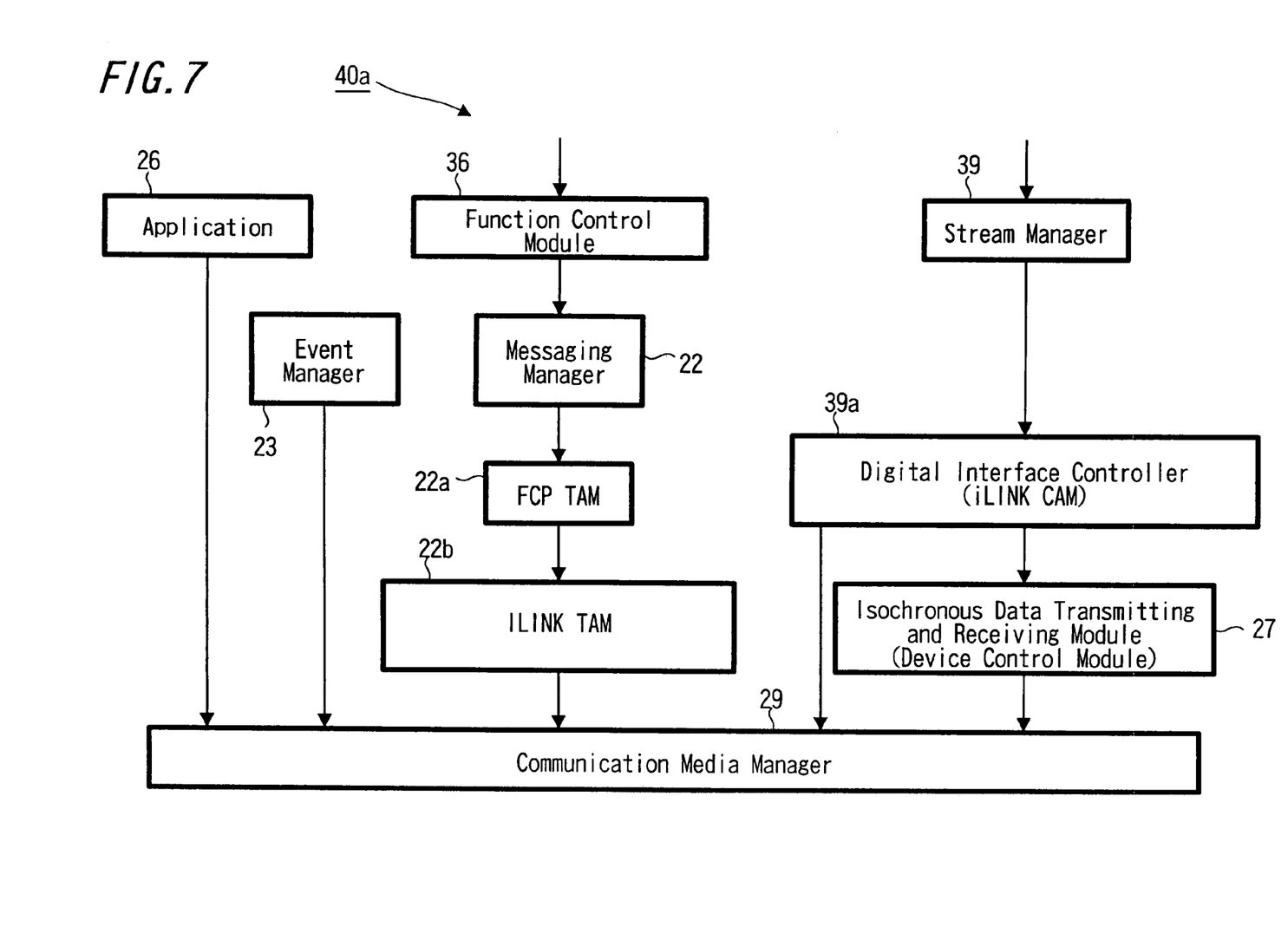
FIG. 7 is a block diagram showing a flow of data to a communication media manager.

A diagram 40a shown in FIG. 7 indicates a communication channel which can be utilized for a communication to the communication media manager 29. The application program layer 26 accesses the communication media manager 29 to receive bus generating information, a GUID list, a speed map, a topology map and the like.

An iLink transportation adaptation module (iLinkTAM) 22b is connected to the communication media manager 29 and serves to give an asynchronous request and an asynchronous response. A digital interface controller 39a (iLink Connection Adaptation Module; iLinkCAM) is connected to the communication media manager 29 and gives an asynchronous request, an asynchronous response, a channel allocation, a channel deallocation, a bandwidth allocation, a bandwidth deallocation and the like. The stream manager 39 utilizes GUID information to establish a one to one (point to point: P to P) communication through the digital interface controller 39a. The device control module 27 carries out a communication with the communication media manager 29 by using isochronous data.

Figure 8:
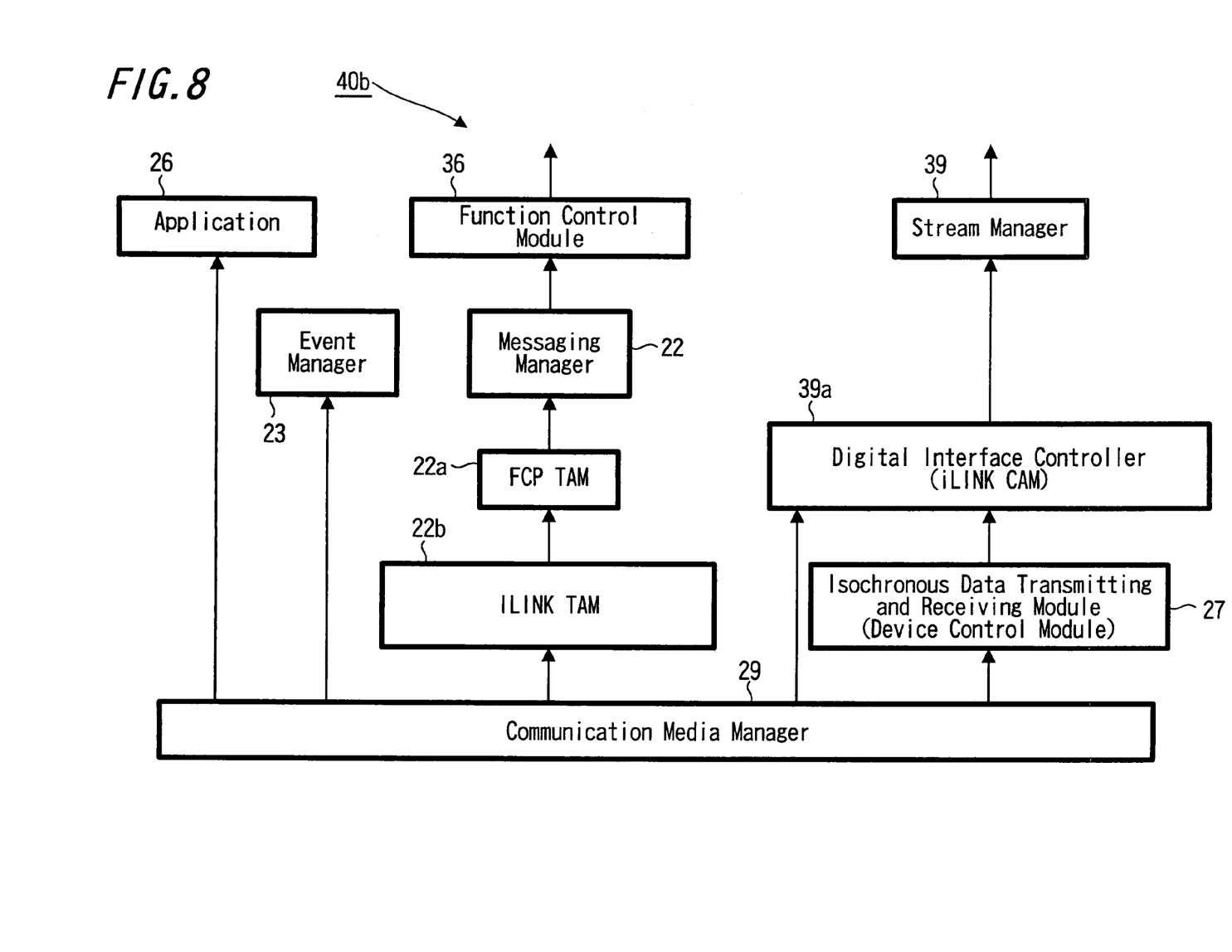
FIG. 8 is a block diagram showing a flow of data from the communication media manager.

A diagram 40b shown in FIG. 8 graphically indicates a communication channel for a communication to be carried out for other objects by the communication media manager 29. The communication media manager 29 gives an instruction for a bus reset to the event manager 23. The communication media manager 29 manages status information about a device which is currently connected to the local bus 9, that is, manages information about which device is added after the GUID list is created and which device is removed. The communication media manager 29 transmits the GUID information and the bus reset information to the iLinkTAM 22b and carries out asynchronous receipt and isochronous receipt. The communication media manager 29 also supplies the same information to the device control module 27 functioning as an isochronous data transmitting and receiving module. Information about a device which is currently connected to the local bus 9 is also supplied to the digital interface controller 39a.

Figure 9:
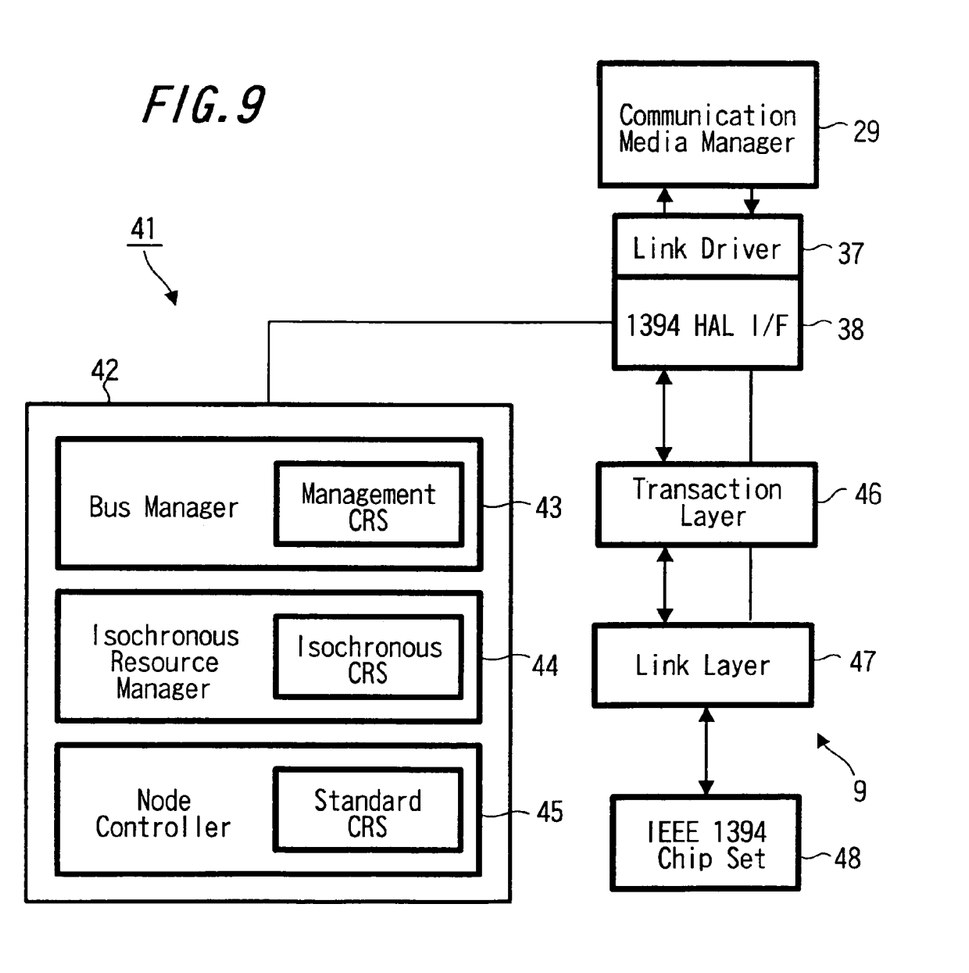
FIG. 9 is a block diagram showing the communication media manager and a bus interface.

FIG. 9 is a diagram showing an IEEE 1394 interface 41 for connecting the communication media manager 29 to the local bus 9 and a serial bus management unit 42 for managing the IEEE 1394 serial communication bus. The communication media manager 29 has a speed map and a topology map which will be described below, and the serial bus management unit 42 includes a bus manager 43, an isochronous resource manager 44 and a node controller 45. The bus manager 43 has a manager control/status register (which will be hereinafter referred to as a CRS). The isochronous resource manager 44 has information about a master ID of a bus and information about a channel and a bandwidth which can be utilized for a communication through the isochronous CRS. The node controller 45 has a configuration ROM and a standard CRS for correcting a node.

The serial bus management unit 42 carries out a communication with the IEEE 1394 HAL interface 38. A transaction layer 46 executes a reading transaction, a writing transaction, a lock transaction and a track pending transaction. If the communication cannot be completed due to the congestion of a communication line or the time-out of a communication time, the communication is retried through a retry protocol by using a busy/time-out register. The data are transmitted by a link layer 47 and an interface unit (IEEE 1394 chip set) 48.

Next, description will be given to an example of a processing to be carried out in the case in which a producer to be a data transmitting device and a consumer to be a data receiving device are connected through a point to point connection (which will be hereinafter referred to as a P to P connection) to be a one to one connection between two devices in the network connected by the bus having the IEEE 1394 method to which the above-mentioned HAVi architecture is applied, and a data transmission is carried out in an asynchronous transportation mode with the connection.

Figure 10:
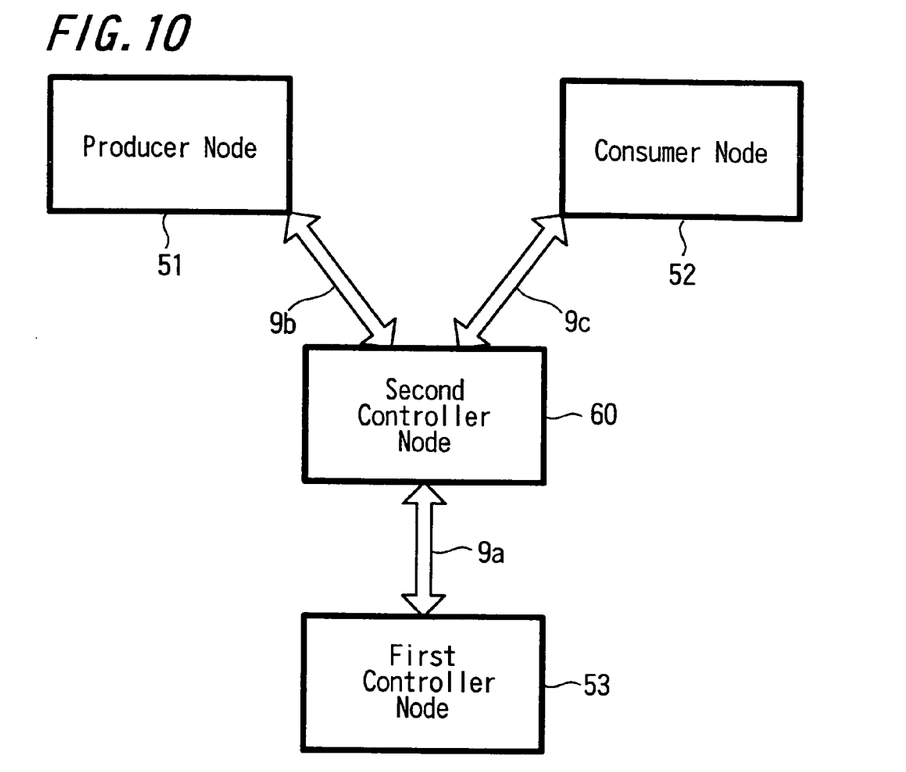
FIG. 10 is a diagram illustrating a transmission control state according to an embodiment of the present invention.

FIG. 10 is a diagram showing a transmission control state obtained when the data transmission is to be carried out in the asynchronous transportation mode between the producer and the consumer. Each device connected to the bus 9 is refereed to as a node and a control section including a first controller node 53 controls the data transmission between a producer node 51 and a consumer node 52. The first controller node 53 serves to carry out a processing of establishing a connection for the data transmission between the producer node 51 and the consumer node 52.

In the present example, it is assumed that the first controller node 53 is a controller having no function required for providing the connection between the producer node 51 and the consumer node 52. At this time, a request for executing a processing of providing the corresponding connection is given to another controller (which will be hereinafter referred to as a second controller node) 60 connected to the network and having the corresponding function (that is, a processing for a connection in the HAVi).

The request given from the first controller node 53 to the second controller node 60 is given as a connect request through the connected bus 9a, and the first controller node 53 obtains a response. In the second controller node 60 receiving the connect request, the AV/C command to give an instruction for providing the P to P connection is transmitted to the producer node 51 and the consumer node 52 through the connected buses 9b and 9c respectively, and the second controller node 60 obtains the responses. FIG. 10 is a diagram showing a transmission state obtained by the buses 9a, 9b and 9c. As described above with reference to FIGS. 1 to 3, the physical connection structure of the bus between the nodes is not always brought into the state shown in FIG. 10.

The second controller node 60 which has carried out the connection establishment processing at the request of the first controller node 53 transmits data on the result of the processing to the first controller node 53.

Figure 11:
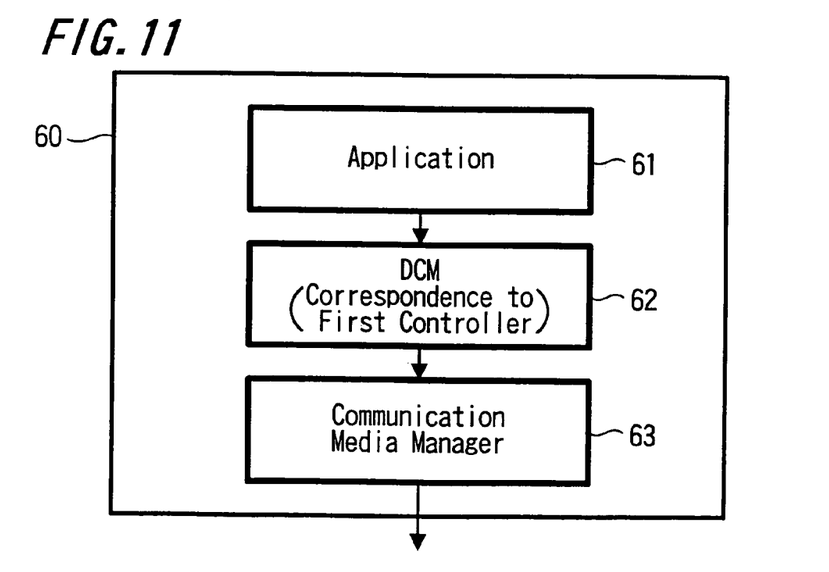
FIG. 11 is a block diagram showing a processing state on a second controller node in FIG. 10.

In the state of the processing in the second controller node 60 receiving the request for the connection establishment, an application 61 mounted on the node 60 causes a device control module (DCM) 62 to be a control section for a connection to execute the management of the P to P connection for the data transmission in the asynchronous transportation mode as shown in FIG. 11, for example. The instruction given to the device control module 62 uses the HAVi massaging. The device control module 62 functions as a device control module corresponding to the first controller node 53.

The device control module 62 receiving the instruction for managing the P to P connection issues an AV/C command for executing a required instruction and transmits the AV/C command to the communication media manager 63, and the communication media manager 63 gives an instruction for transmitting, to the bus 9, packet data to be transmitted to the bus having the IEEE 1394 method.

In the connection for the data transmission in the asynchronous transportation mode, first of all, a processing referred to as "connect" is carried out as a processing of managing the P to P connection to be executed by the controller node at this time. Thus, a work for ensuring transmitting and receiving resources is carried out so that a transmission path can be established. When the transmission path is established, a necessary data transmission is carried out between the producer node and the consumer node. After the data transmission is completed, the resources for the producer and the consumer are disconnected through a processing referred to as "disconnect" for the controller node to carry out disconnection if necessary. Thus, a work for disconnection is carried out.

According to an example of the processing to be executed by the device control module 62, the following instruction is sent in the "connect" processing for providing the connection.

Status DCM . . . ConnectATM
   In Guid producerGuid
   In Guid consumerGuid
   Out PlugId producerPlug
   Out PortId producerPort
   Out PlugId consumerPlug
   Out PortID consumerPort Each parameter will be described below. The producerGuide indicates a node unique ID of a producer to be a transmitting source, the consumerGuid indicates a node unique ID of a consumer to be a receiving destination, the producerPlug indicates a plug number of the producer which is to be used for a transmission, the producerPort indicates a port number of the producer which is to be used for the transmission, the consumerPlug indicates a plug number of the consumer which is to be used for the transmission, and the consumerPort indicates a port number of the consumer which is to be used for the transmission. For example, three kinds of data, that is, data indicative of the success of a connection, data indicating that the connection cannot be carried out and data indicating that the connection cannot be carried out temporarily are prepared for the data of a status to be the state of the node of a partner providing the connection.

In the "disconnect" processing for the disconnection, the following instruction is sent.

Status DCM . . . DisconnectATM
   In Guid producerGuid
   In Guid consumerGuid
   In PlugId producerPlug
   In PortId producerPort
   In PlugId consumerPlug
   In PortID consumerPort Each parameter will be described below. The producerGuide indicates a node unique ID of a producer to be a transmitting source, the consumerGuid indicates a node unique ID of a consumer to be a receiving destination, the producerPlug indicates a plug number of the producer used for a transmission, the producerPort indicates a port number of the producer used for the transmission, the consumerPlug indicates a plug number of the consumer used for the transmission, and the consumerPort indicates a port number of the consumer used for the transmission. For example, three kinds of data, that is, data indicative of the success of a disconnection, data indicating that the disconnection is maintained and data indicating that the disconnection cannot be carried out currently are prepared for the data of a status to be the state of the node of a partner providing the connection.

Figure 12:
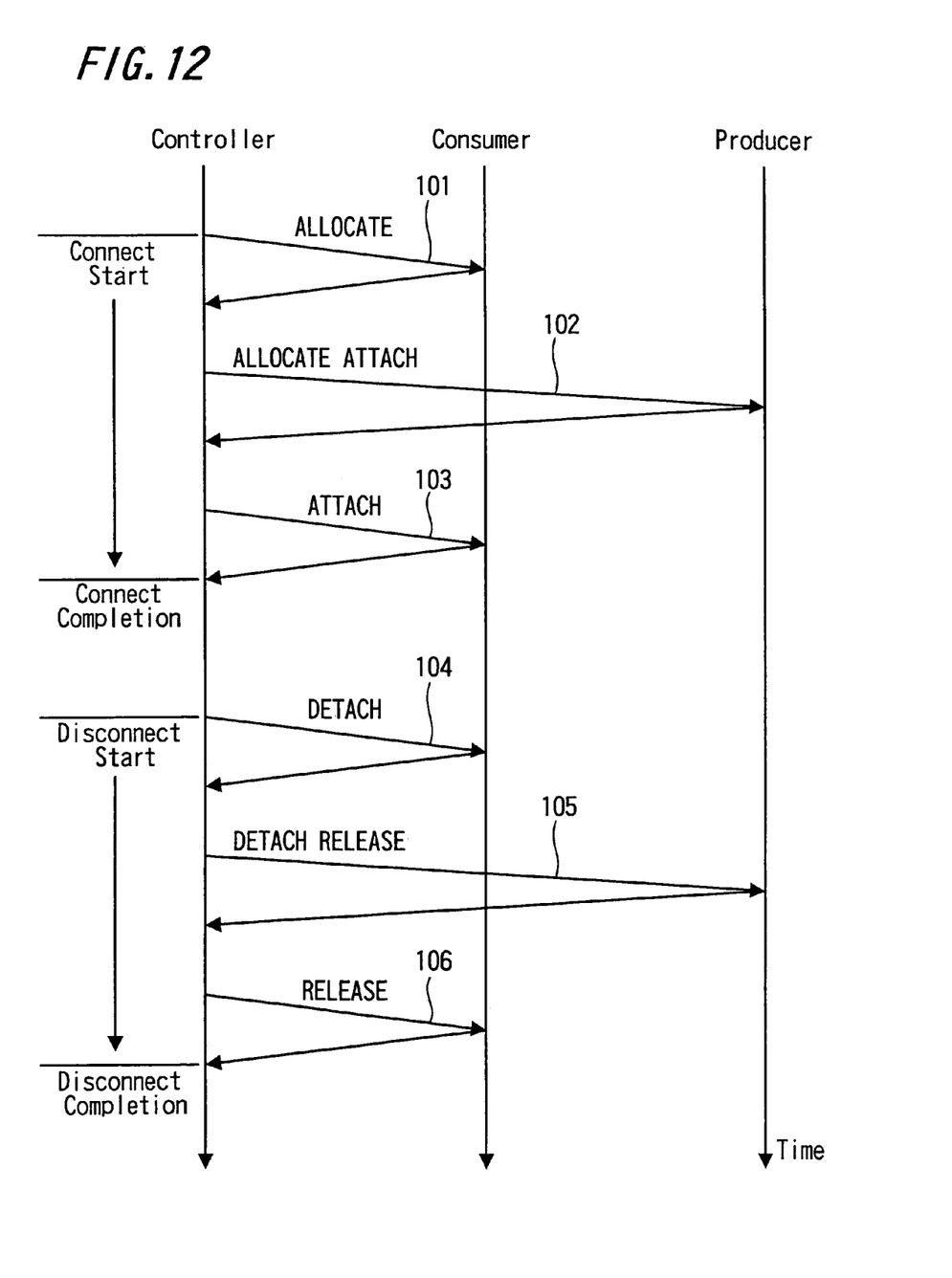
FIG. 12 is a diagram illustrating an example of connection management according to the embodiment of the present invention.

FIG. 12 is a diagram showing a state in which the connect processing and the disconnect processing are carried out through the transmission of the AV/C command to the producer and the consumer which are connected to each other through the bus under the control of the controller. During the connect processing, first of all, an allocate command (ALLOCATE) is sent from the controller to the consumer (Step 101) and a response is obtained. Next, an allocate/attach command (ALLOCATE/ATTACH) is sent from the consumer to the producer (Step 102) and a response is obtained. Subsequently, an attach command (ATTACH) is sent from the controller to the consumer (Step 103) and a response is obtained. Thus, the connect processing is completed.

During the disconnect processing, next, a detach command (DETACH) is sent from the controller to the consumer (Step 104) and a response is obtained. Then, a detach/release command (DETACH/RELEASE) is sent from the consumer to the producer (Step 105) and a response is obtained. Subsequently, a release command (RELEASE) is sent from the controller to the consumer (Step 106) and a response is obtained. Thus, the disconnect processing is completed. In the present example, the controller for issuing such an AV/C command during the connect processing and the disconnect processing acts as the second controller node 60.

Figure 13:
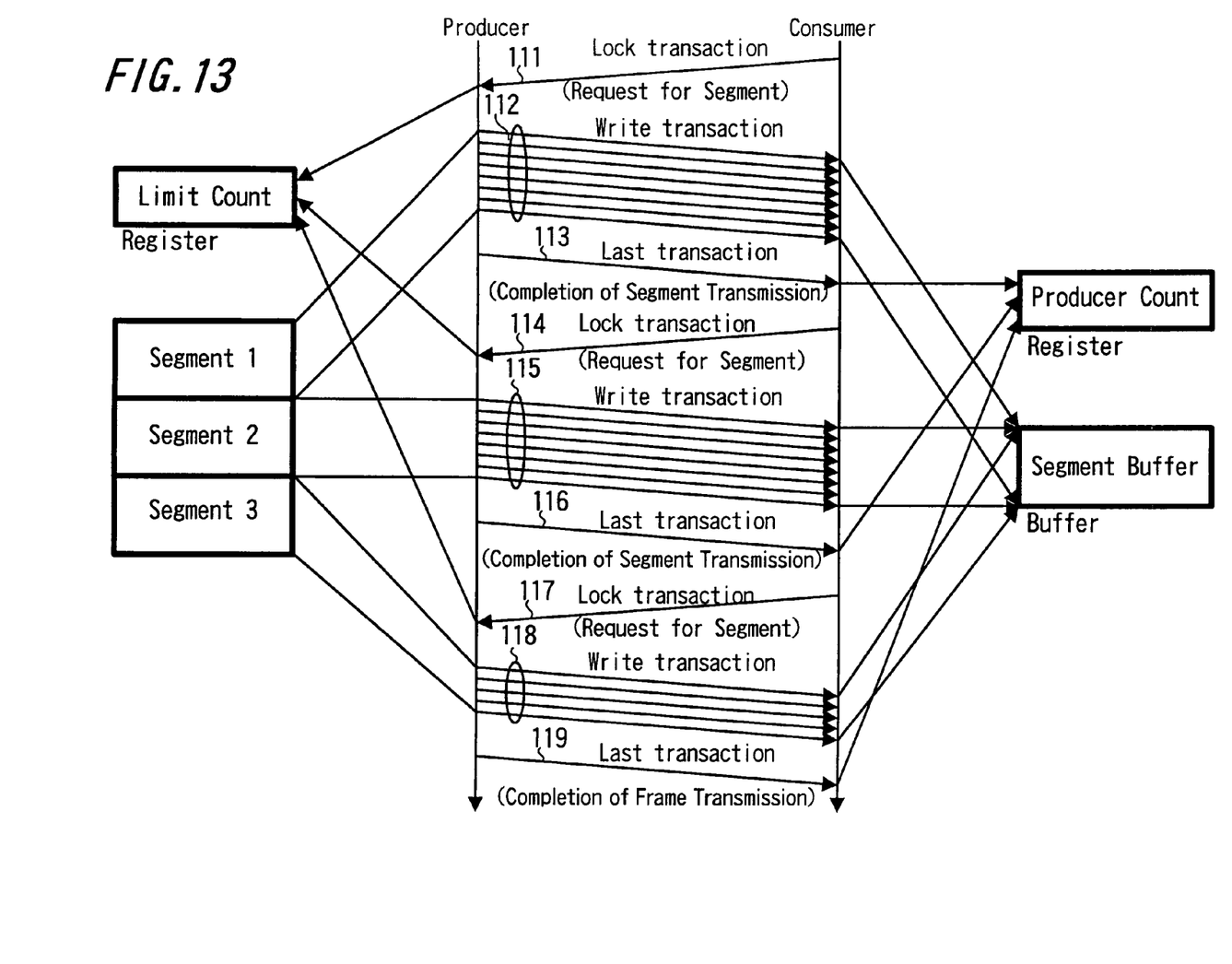
FIG. 13 is a diagram illustrating an example of a data transmission according to the embodiment of the present invention.

An example of the data transmission state between the producer node and the consumer node which are P to P connected through the connect processing will be described below with reference to FIG. 13. Transmission data divided into three segments (segments 1, 2, 3) are prepared for a buffer on the producer side, and a register for receiving a request from the partner is prepared for each node. First of all, the consumer gives the producer a request for the transmission of the segment in the lock transaction (Step 111). The producer receiving the request transmits data of the segment 1 in the write transaction (Step 112). When the data of the segment 1 are completely transmitted, the producer sends the completion of the segment transmission in the last transaction (Step 113).

Subsequently, the lock transaction (Steps 114 and 117) sent from the consumer and the write transaction (Steps 115 and 118) and the last transaction (Steps 116 and 119) which are sent from the producer are executed until the transmission of the segment data prepared in the same manner are ended. In the last transaction (Step 119), the completion of a frame transmission is sent.

Thus, in the case in which a device to be connected to a network and to originally function as a controller for a data transmission between two devices does not mount a connection establishment processing function required for the data transmission, a processing of establishing a connection is executed by utilizing the function mounted on other devices connected to the network. Thus, the data transmission can be carried out in an asynchronous transportation mode. Accordingly, if the function required for the connection establishment is mounted on at least one device in the network, the mounted function can be shared by all the devices in the network. Consequently, the burden of each device constituting the network can be lessened correspondingly.

Moreover, the data on the connection setting state are transmitted from the second controller node 60 to the first controller node 53 giving the request for the connection establishment. Therefore, the connection setting state can be decided by the first controller node 53 and the first controller node 53 can carry out the same decision and management processing as in the case in which it directly executes the connection setting management.

While only the connection establishment management in the function managed by the controller is executed by another controller in the above-mentioned example, a request for the function to be executed by the other controllers may be given to another controller. More specifically, the function of the controller includes the function required for establishing a connection, the function related to the contents of an AV/C command to be transmitted, the management function of device information of a producer and a consumer, the management function of a node ID, the management function of a status, the connection management function for a bus reset and the like. A request for these various management functions may be given to other controllers in the same manner. In particular, it is preferable that the device executing the connection management should carry out the connection management function during the bus reset generated when the network structure is changed such that countermeasures can be taken when the bus reset is generated while the data transmission is performed between two devices.

In the above-mentioned embodiment, the controller which cannot execute the connection setting management gives a request for the connection management to another controller mounting the corresponding function. When there is a controller which cannot execute the connection setting management, it may be operated as a controller mounting the corresponding function by transmitting data on the function from another device mounting the corresponding function. In other words, data (HAVi bytecode) for implementing the function related to the connection of the asynchronous transportation mode may be downloaded from another device on the network to a device control module of the same device, for example, and the same device may be caused to function as a controller capable of carrying out the connection setting.

Although the case in which the present invention is applied to the HAVi network connected through the bus having the IEEE 1394 method in the above-mentioned embodiment, it can also be applied to the case in which the same data transmission is carried out between the devices having other network structures.

In the transmitting method according to the first aspect of the present invention, the connection management for the data transmission in the network is executed. Consequently, even if the device for directly controlling the data transmission between the transmitting device and the receiving device cannot execute the connection management, other devices provided in the network can execute the corresponding connection management. Thus, all the devices for carrying out communication control in the network do not need to have the connection management function. Correspondingly, it is possible to simplify the network structure or the structure of each device.

According to the transmitting method in accordance with the second aspect of the present invention, in the invention of the first aspect, the connection management to be requested by the first device includes a processing of providing a connection between at least the transmitting device and the receiving device and a processing of disconnection. Consequently, it is possible to carry out a series of transmission control until the disconnection is executed after the connection is provided to perform the data transmission.

According to the transmitting method in accordance with the third aspect of the present invention, in the invention of the first aspect, the result of the connection management executed based on the request is given from the second device executing the connection management to the first device through the network. Consequently, the transmission control state can be grasped on the first device side requesting the connection management. Thus, the transmission control can be carried out well.

According to the transmitting system in accordance with the fourth aspect of the present invention, in the case in which the first device is to control the data transmission between the transmitting device and the receiving device, the connection management is executed by the second device. Consequently, even if the device having no function of managing the corresponding connection is connected to the network, the connection management based on an instruction in the device can be carried out. Thus, it is possible to enhance the degree of freedom of the control for the data transmission in the network.

According to the transmitting system in accordance with the fifth aspect of the present invention, in the invention of the fourth aspect, the connection management to be executed by the control section of the second device includes a processing of providing a connection of at least the transmitting device and the receiving device and a processing of disconnection. Therefore, it is possible to carry out a series of transmission control until the disconnection is executed after the connection is provided to perform the data transmission. According to the transmission control device in accordance with the sixth aspect of the present invention, when the connection setting request is received from another device on the network, the device can execute the connection management. If the device is connected to the network, it is possible to execute the connection management for the data transmission between all the devices in the network.

According to the transmission control device in accordance with the seventh aspect of the present invention, in the invention of the sixth aspect, further comprises a transmitting section for transmitting the result of management in the connection managing section to other devices. Consequently, the connection setting situation on the network can be grasped on the device side giving the connection setting request.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A transmitting system for transmitting data from a transmitting apparatus to a receiving apparatus connected to a predetermined network, the system comprising:

a first controlling apparatus connected to a predetermined network, said first controlling apparatus including a first control section for preparing and transmitting a request to another controlling apparatus to execute a connection management function when the first controlling apparatus does not mount a control module of said connection management function and has been notified by said another controlling apparatus that said another controlling apparatus mounts a control module of said connection management function, said request including a request for executing the connection management to establish a connection between the transmitting apparatus and the receiving apparatus on the predetermined network and to execute data transmission from the transmitting apparatus to the receiving apparatus through the connection by using a control module of a corresponding connection management function mounted in said another controlling apparatus; and a second controlling apparatus configured to receive said request, said second controlling apparatus including a second control section for executing the connection management function, wherein the request includes a self-describing data structure, which provides a device control data, and wherein the device control data includes an override DCM of the transmitting device and the receiving device.

2. A transmitting system for transmitting data from a transmitting device to a receiving device connected to a predetermined network, the system comprising:

a first device including a first control section for preparing and transmitting a request to another device to mount a connection management function from a plurality of connection management functions when the first device does not mount said connection management function and has been notified by said another device that said another device mounts said connection management function, said request including a request for executing the connection management for data transmission between the transmitting device and the receiving device; and a second device configured to receive said request, said second device including a second control section for executing the connection management function, wherein the request includes a self-describing data structure, which provides a device control data, and wherein the device control data includes an override DCM of the transmitting device and the receiving device.

* * * * *